(12) United States Patent
Juels et al.

(10) Patent No.: US 8,499,157 B1
(45) Date of Patent: Jul. 30, 2013

(54) DEVICE-BASED PASSWORD MANAGEMENT

(75) Inventors: Ari Juels, Brookline, MA (US); Daniel Bailey, Pepperell, MA (US)

(73) Assignee: EMC Corporation, Hopkinton, MA (US)

( * ) Notice: Subject to any disclaimer, the term of this patent is extended or adjusted under 35 U.S.C. 154(b) by 343 days.

(21) Appl. No.: 12/893,684

(22) Filed: Sep. 29, 2010

(51) Int. Cl.
*H04L 29/06* (2006.01)

(52) U.S. Cl.
USPC ........... 713/171; 380/262; 380/273; 380/277; 380/278; 380/44

(58) Field of Classification Search
USPC ......................................................... 713/171
See application file for complete search history.

(56) References Cited

U.S. PATENT DOCUMENTS

| 2004/0062400 | A1* | 4/2004 | Sovio et al. | 380/286 |
|---|---|---|---|---|
| 2004/0177258 | A1* | 9/2004 | Ong | 713/192 |
| 2006/0116107 | A1* | 6/2006 | Hulvey | 455/411 |
| 2006/0224885 | A1* | 10/2006 | Lillie et al. | 713/153 |
| 2007/0165844 | A1* | 7/2007 | Little | 380/30 |
| 2007/0277230 | A1* | 11/2007 | Hawkins et al. | 726/4 |
| 2009/0037983 | A1* | 2/2009 | Chiruvolu et al. | 726/4 |
| 2009/0049307 | A1* | 2/2009 | Lin | 713/185 |
| 2009/0319799 | A1* | 12/2009 | Carpenter et al. | 713/189 |
| 2009/0327727 | A1* | 12/2009 | Meijer et al. | 713/170 |
| 2010/0106927 | A1* | 4/2010 | Hogan et al. | 711/163 |

OTHER PUBLICATIONS

Kumar et al., Embedded end-to-end wireless security with ECDH key exchange, Dec. 2003, IEEE 46th Midwest Symposium on Circuits and Systems, vol. 2, pp. 786-789.*
"How Bluetooth Works," retrieved on Jan. 13, 2011 from http://en.kioskea.net/contents/bluetooth/bluetooth-fonctionnement.php3.

* cited by examiner

*Primary Examiner* — Taghi Arani
*Assistant Examiner* — Kenneth Chang
(74) *Attorney, Agent, or Firm* — BainwoodHuang

(57) ABSTRACT

A first device (e.g. smartphone) manages a first key (e.g. password) required for a security operation with a second device (e.g., WWW server) by calculating and storing a key seed using the first key and a second key shared with a third device (e.g., wireless headset). Later (e.g., upon losing communication with the third device), at least a portion of the first and second keys is/are erased to prevent the security operation. Subsequently (e.g., when communication with third device is reestablished), the first key is regenerated by (1) receiving a key hint from the third device, (2) regenerating the second key using the key hint and a known message used to create the key hint, and (3) regenerating the first key using the key seed and the regenerated second key.

24 Claims, 2 Drawing Sheets

DEVICE-BASED PASSWORD MANAGEMENT

BACKGROUND

The invention is directed to the field of data security, and more particularly to techniques for managing passwords or other keys used in security operations such as user authentication.

Passwords are commonly used for purposes of authenticating a user of a computer system as a condition of permitting access to protected data and/or functions. For example, an online banking application requires that a customer provide a correct password or personal identification number (PIN) before allowing the customer to access his/her account information or perform banking transactions.

As computer use proliferates, especially with mobile computing that enables users to access information almost anywhere and anytime, users and administrators increasingly encounter the problems of password management—the need to establish, protect and use an increasingly large set of passwords for a variety of different computer systems and applications. Passwords can easily be forgotten, necessitating some cumbersome process of re-establishing a password before access to a desired service is granted. Additionally, it is necessary for users to enter passwords using the small keyboards of mobile devices, which may be more error-prone than when a regular-size keyboard (of a desktop computer, for example) is used. Another factor contributing to the burden of passwords is an increased focus on data security. Many applications have a time-out feature that requires a user to re-enter a password if sufficient period of inactivity has elapsed, to reduce the opportunity for unauthorized intrusions.

SUMMARY

The present invention is directed at the problem of password management, especially on mobile computerized devices such as cell phones, tablet computers, and netbook computers. A password fundamentally represents something that a user knows. Because users increasingly carry multiple devices with computing functionality, such devices can be used as bearers of information that can be used to automatically generate a password, reducing the password-management demand on users. Additionally, the disclosed technique makes use of the devices in this way without necessarily requiring the devices to be aware of this use. This feature can promote easier adoption of the disclosed technique because of its inherent backwards compatibility with existing devices.

A method is disclosed by which a first device manages a first key required for executing a security operation with a second device, where the second device provides access to protected data or functionality. For example the second device may be a WWW server providing online banking services, as described above. The first key may be a password or PIN provided for user authentication as the security operation.

The method includes calculating and storing a key seed during a period in which the first key is stored in a memory of the first device. The key seed is calculated by a first cryptographic operation using the first key and a second key which is shared with a third device. Generally, the use of the second key between the first and third devices is for a purpose unrelated to the activity between the first and second devices. In one example, the first device may be a mobile smartphone and the third device a wireless Bluetooth headset. The second key is established and used according to the Bluetooth protocol for communications between the smartphone and headset (which is unrelated to the use of online banking services by the first device at the second device). For purposes of the disclosed method, the second key becomes used in a process of automatically regenerating the first key for use in the security operation with the second device.

At some time after the key seed has been stored, at least a portion of the first and second keys is/are erased to prevent execution of the security operation by the first device. In one embodiment this erasing may occur when a communications connection between the first device and the third device is lost, such as when a wireless headset is turned off or goes out of range from a smartphone.

During a subsequent period in which the first device is in communication with the third device, the following operations are performed. First, the first device receives a key hint from the third device. The key hint is generated by a second cryptographic operation at the third device using the second key and a message known to the first device. In one example, the known message may be part of a standard message sent by the third device whenever communications is reestablished. Alternatively, the known message may be an expected response in a challenge-response exchange which is controlled by the first device.

The first device then regenerates the second key using the key hint and the known message. In this process, a so-called "brute force" search may be employed in which all possible values of the second key are used in successive decrypting operations until the known message is successfully obtained from the key hint. The extent of the key space to be searched may be reduced by retaining some portion of the second key at the time of erasure. Once the second key has been regenerated, the first key is regenerated by performing a third cryptographic operation using the key seed and the regenerated second key, the third operation generally being the inverse of the initial calculation of the key seed. Once the first key is regenerated, it is available for use in the security operation with the second device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
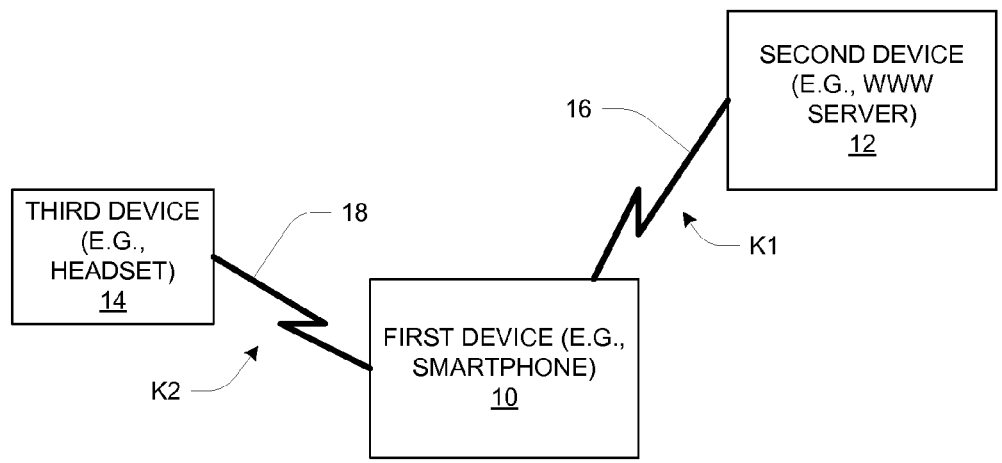
FIG. 1 is a block diagram of a system of interconnected computerized devices.

FIG. 1 shows a system including a first device 10 in communication with a second device 12 and a third device 14 over respective communications links 16, 18. In one embodiment, the first device 10 is a portable computerized device such as a smartphone; the second device 12 is a separate computerized device such as a WWW server; and the third device 14 is a local peripheral device such as a wireless headset. In this embodiment, the communications link 18 may be a local-area or personal-area wireless link (conforming for example to the so-called Bluetooth® standard, IEEE 802.15.1), and the communications link 16 may include a wide-area wireless connection such as employed in the Public Land Mobile Network (PLMN, also referred to as "cellular network").

As shown in FIG. 1, two keys K1 and K2 are used by the first device 10. A first key K1 is used between the first device 10 and second device 12 as part of a security operation. In one embodiment, the first key K1 may be a password or personal identification number (PIN) used for purposes of authenticating a user of the first device 10 to the second device 12. Passwords are commonly used to enable a user to access an account, service, or other protected data and/or function at a remote server such as a WWW server 12. Part of the benefit of the presently disclosed technique is the ability to automatically generate the first key K1 based on information received from the third device 14 instead of requiring a user to remember the first key K1 and provide it upon each use. The second key K2 is used between the first device 10 and the third device 14. The second key K2 may be a symmetric key used to encrypt communications between the first device 10 and third device 14, for example. In general, the purpose and use of the second key K2 between the first device 10 and third device 14 are unrelated to the security operation that is performed between the first device 10 and second device 12. Specific examples are discussed below.

Figure 2:
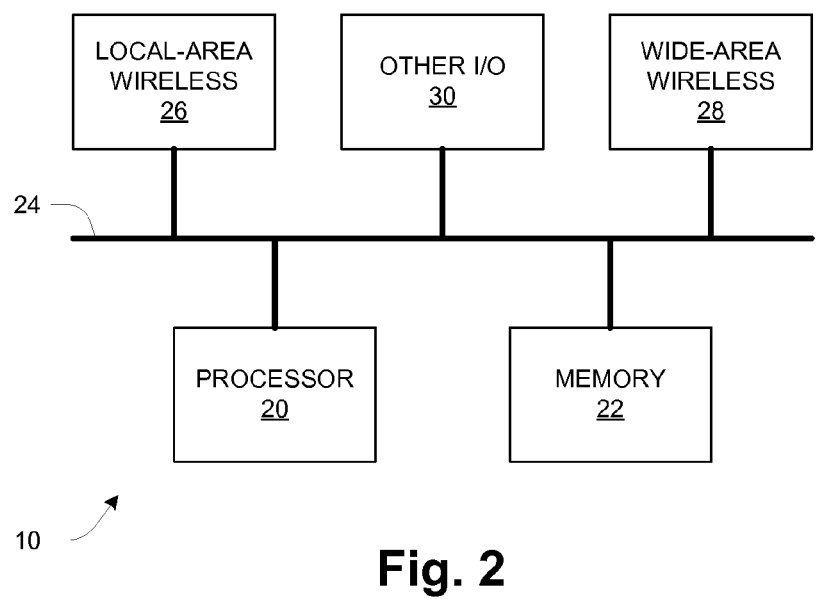
FIG. 2 is block diagram of a computerized device.

FIG. 2 provides a representative hardware block diagram of the smartphone 10. It includes a processor 20, memory 22, and input/output (I/O) circuitry connected together by one or more data buses or similar interconnect 24. The I/O circuitry includes local-area wireless interface circuitry 26 that interfaces with the communications link 18, wide-area wireless circuitry 28 that interfaces with the communications link 16, and other I/O circuitry 30 such as a display screen, keyboard, audio devices, etc. The memory 22 generally includes fast, volatile memory used during program execution and slower, non-volatile memory for program and data storage. The processor 20 typically includes a program instruction execution unit and additional functional components as generally known in the art.

The hardware structures of the second and third devices 12, 14 are not specifically shown herein. They will generally be electronic devices with processing circuitry of an appropriate capability. Thus, when the second device 12 is realized as a WWW server, for example, it may include one or more processors and a relatively large memory, along with an interface to an external data storage system and an interface to a data network which includes the communications link 16. The third device 14 may have much more limited processing capability, such as in the case of a wireless headset or similar peripheral device for example.

Figure 3:
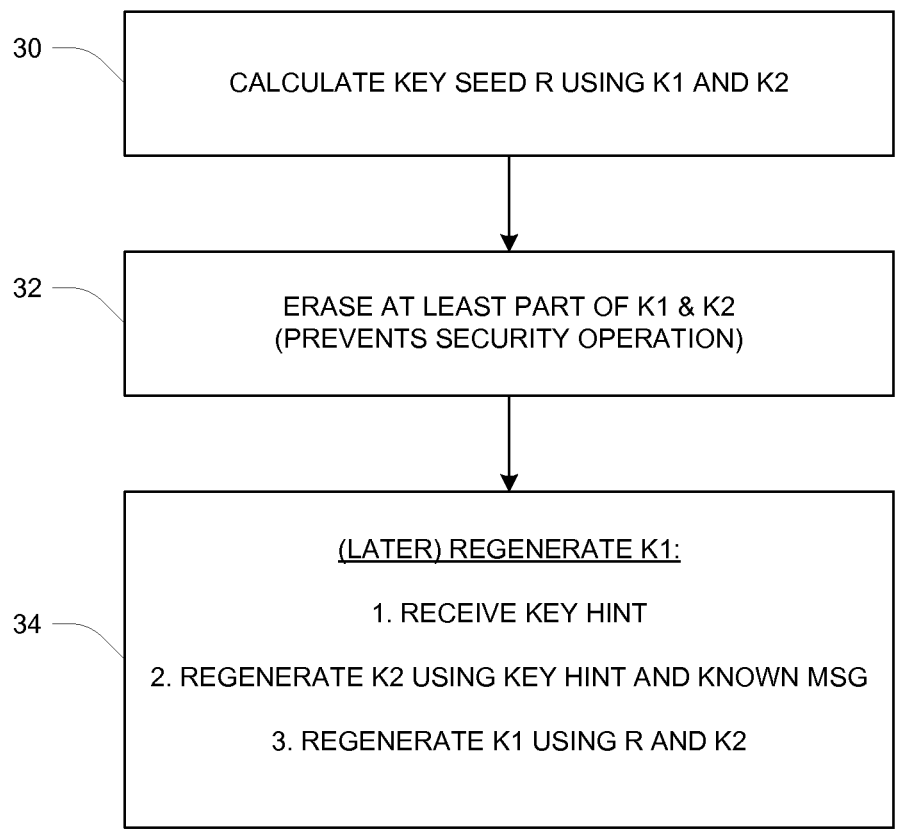
FIG. 3 is a flow diagram depicting operation of the system of FIG. 1.

FIG. 3 illustrates a process performed by the first device 10 in conjunction with the second and third devices 12, 14. It is assumed that the first and second keys K1, K2 have previously been established for their respective uses. For example, K1 may have been established using a conventional password-creation function of an online service provided by the WWW server 12. K2 may have been established as a symmetric encryption key as part of the so-called "pairing" process of Bluetooth.

At 30, a key seed labeled "R" is calculated by the first device 10 using K1 and K2. The key seed R is retained within the first device 10 and used in a later process of regenerating the first key K1, as described below. The key seed R may be calculated in any of a variety of ways, such as by hashing or similar operations. In one embodiment, R can be calculated as a modulo arithmetic sum of K1 and K2, i.e. R=K1 xor K2 (where "xor" denotes a bitwise exclusive-OR logic function). In a more specific implementation, it may be desirable to first de-concatenate or divide the key K2 into two constituent components which may be labeled K2a and K2b (i.e., K2=K2a|K2b where "|" denotes concatenation), and then use only one of the components (such as K2b) in the calculation of R. In this case, R is calculated as R=K1 xor K2b. This approach may be used to support later regeneration of the key K2 in some embodiments, as described below.

At 32, part or all of the keys K1 and K2 are deleted or erased at the first device 10, which has the effect of preventing the first device 10 from engaging in the security operation with the second device 12. The erasing may be done under different conditions in different embodiments. When the third device 14 is a headset or similar peripheral component of the first device 10, the erasing may be performed when the third device 14 becomes disconnected or otherwise loses communication with the first device 10. For the specific case of a wireless third device 14 such as a Bluetooth headset, such disconnection may occur when the wireless link 18 becomes unusable for data transfer, which can occur for example when the third device 14 is located outside of a certain operating range away from the first device 10. In alternative embodiments, the erasing may be done based on some other criteria such as some form of timeout, for example the passing of a predetermined time since the last communication between the first device 10 and one or both of the second device 12 and the third device 14.

At 34, the first key K1 is regenerated in order to enable the first device 10 to again engage in the security operation with the second device 12. This operation requires that the first device 10 be in communication with the third device 14. Thus in the case of a wireless headset, for example, the headset 14 may have been turned on or moved back within range of the first device 10.

The process of regenerating the key K1 includes three operations as shown at 34. In a first operation, the first device 10 receives a key hint from the third device 14. The key hint is generated by the third device using the second key K2 and some message which is known to the first device 10. Details regarding possible key hints are discussed below. In a second operation, the first device 10 uses the key hint and the known message to regenerate the second key K2, an operation generally involving a search of a key space for a key which can successfully decrypt the known message. Some specifics are provided below. Once K2 is regenerated, then in a third operation the first device 10 performs a cryptographic operation using the key seed R and the regenerated second key K2 to regenerate the first key K1. This operation can be seen as the inverse of the operation performed in step 30. The regenerated first key K1 can then be used by the first device 10 to execute the security operation with the second device 12.

The key hint used at 34 may take various forms. Generally it will include a version of a message known to the first device 10, encrypted using the shared key K2. In one approach, the sending of a key hint may be implicit in the normal operation of the communications link 18. For example, the message may be some portion of a standard message header that is always used for an initial communication when the third device 14 becomes connected to (or back within range of) the first device 10. The Bluetooth session initiation protocol includes such a feature. The first device 10 knows the contents of the standard message header, and can use this knowledge in conjunction with the encrypted version of the header to search for the key value. This kind of approach has the benefit that it may enable adoption of the presently disclosed technique for use with pre-existing third devices 14 that are unaware of the use of the shared secret K2 by the first device 10 in the manner described herein.

Alternatively, the known message may be a response part of a challenge-response exchange that is performed when communications are first established or re-established. In that case, the first device 10 may preferably pre-compute and store both a challenge and the corresponding correct response. The key K2 may be regenerated on the assumption that the correct response has been given (which will normally be the case). In this kind of approach to regenerating K2, it may be desirable that there be some test that reflects the possibility that K2 cannot be regenerated because the incorrect response may have been given (in which case the message conveyed to the first device 10 is actually an unknown message and therefore not usable for regenerating K2).

One technique for regenerating K2 based on the known message is referred to as a "brute-force" search. In this approach, different candidate values of K2 (generally all possible values) are tried until the correct value is found by successful decryption of the key hint. Such an approach may be costly and not computationally feasible in some cases. For example, if K2 is a 128-bit number then the space of all possible keys has a size of $2^{128}$, which could not feasibly be searched in a brute-force fashion. Thus, it may generally be desirable to somehow reduce the size of the space of keys to be searched. This can be done, for example, by erasing only a part of K2 in step 32 and retaining the remainder, so that only the erased part is regenerated at 34. As described above, in this approach R may have been calculated from K2$b$, for example. Thus at step 34, K2$b$ is first regenerated, and then re-concatenated with K2$a$ to form a fully regenerated K2.

The process of FIG. 3 can be repeated for subsequent cycles of erasing and then regenerating the first key K1. It may be desirable to include additional randomization (e.g., time-varying) in the calculation of the key seed R to provide protection against certain types of attacks that might be mounted to thwart the protection offered by the technique.

Based on the above description, the third device 14 effectively becomes a bearer of part of the key K1, insofar as it is required that the first device 10 be in communication with the third device 14 to regenerate the first key K1. From this perspective, it is desirable that the third device 14 be physically distinct from the first device 10, and additionally that the third device 14 normally be stored or carried separately from the first device 10 to reduce the chances that an unauthorized user can take possession of both devices. If an unauthorized user takes possession of the first device 10 but not the third device 14, the operations at 34 cannot be successfully performed and therefore the security operation cannot be executed by such unauthorized user.

In the above description, the second key K2 is described as a symmetric key used to encrypt communications between the first device 10 and third device 14, which in one case utilize the personal-area Bluetooth protocol. More generally, the second key K2 can be a secret shared between the first device 10 and the third device 14. Symmetric keys for encrypted communications may generally be good candidates, and other specific examples of such communications include Secure Sockets Layer (SSL) encryption, IEEE 802.11i (WiFi) encryption, and Internet Protocol Security or IPSec.

The above-described technique for protecting sensitive data or functionality available at the second device 12 need not be exclusive of other security techniques, and it may be beneficial in some embodiment to use the disclosed technique in combination with other security techniques to further enhance security. For example, it may be desirable to include one or more additional factors in the key that is ultimately provided to the second device 12 to execute the security operation, such as a separate PIN or master password known only to a user and never persistently stored in the first device 10, or biometric data representing a physical characteristic of the user.

Additionally, in alternative embodiments the shared secret (e.g., K2) used to regenerate K1 may be distributed among multiple devices, either in a redundant form (so that information obtained from any one of them will enable regeneration of K1) or in a divided form so that it is necessary to obtain information from some number of the devices to enable regeneration of K1. The latter approach falls into the general category of "secret-sharing" or "split-secret" schemes. In one class of secret-sharing scheme, it is necessary for some m out of n (m<=n) to provide a correct share in order to sufficiently reconstruct the secret for an intended use.

Also, in alternative embodiments the key hint sent by the third device 14 may be based on more than one message known to the first device 10, and/or the third device 14 may send more than one key hint for use by the first device 10 in reconstructing the keys K2 and K1.

While various embodiments of the invention have been particularly shown and described, it will be understood by those skilled in the art that various changes in form and details may be made therein without departing from the spirit and scope of the invention as defined by the appended claims.

What is claimed is:

1. A method by which a first device manages a first key required for execution of a security operation with a second device, comprising:
    calculating and storing a key seed during a period in which the first key is stored in a memory of the first device, the key seed being calculated by a first cryptographic operation using the first key and a second key shared with a third device;
    subsequently erasing at least a portion of the first and second keys to prevent execution of the security operation by the first device; and
    during a subsequent period in which the first device is in communication with the third device:
    receiving a key hint from the third device, the key hint being generated by a second cryptographic operation at the third device using the second key and a message known to the first device;
    regenerating the second key using the key hint and the known message; and
    regenerating the first key by performing a third cryptographic operation using the key seed and the regenerated second key;
    wherein the third device is a portable device that is in communication with the first device when located with the first device and is not in communication with the first device when located away from the first device;
    wherein the subsequent period in which the first device is in communication with the third device is a period in which the third device is co-located with the first device following an immediately preceding period in which the third device is not co-located with the first device and not in communication with the first device; and
    the erasing is performed during the immediately preceding period.

2. A method according to claim 1, wherein the first key is password or personal identification number of a user of the first device, and the security operation is a login process of an online service provided via the second device.

3. A method according to claim 1, wherein the second key is an encryption key used in symmetric key encryption of communications between the first device and the third device unrelated to the security operation.

4. A method according to claim 1, wherein the third device is a peripheral input/output device for the first device.

5. A method according to claim 4, wherein the peripheral input/output device is a wireless audio headset.

6. A method according to claim 4, wherein the peripheral input/output device is operative to engage in a pairing operation with the first device by which the second key is established.

7. A method according to claim 6, wherein the second key is an encryption key used in symmetric key encryption of communications between the first device and the peripheral input/output device.

8. A method according to claim 1, wherein regenerating the second key includes brute-force searching of at least a portion of a key space containing the second key.

9. A method according to claim 8, wherein the portion of the key space is a sub-space defined by a retained portion of the second key which is retained during the erasing, and wherein regenerating the second key includes regenerating an erased portion of the second key and combining the regenerated erased portion with the retained portion.

10. A method according to claim 1, wherein the key hint includes predictable data conveyed from the third device to the first device in a normal operation unrelated to the security operation.

11. A method according to claim 10, wherein the predictable data is a response provided in a challenge-response exchange constituting the normal operation between the first device and the third device.

12. A method according to claim 11, wherein at least one of the key hint and the known message is one of multiple key hints and/or known messages respectively, the multiple key hints and/or known messages being used in the regenerating of the second key.

13. A device operative as a first device to manage a first key required for execution of a security operation with a second device, comprising:
 a processor;
 memory;
 input/output circuitry providing communications between the first device and both the second device and a third device; and
 interconnect circuitry operative to communicatively connect the processor, memory and input/output circuitry together,
 the processor executes program instructions from the memory to perform a method of managing the first key, the method including:
 calculating and storing a key seed during a period in which the first key is stored in the memory, the key seed being calculated by a first cryptographic operation using the first key and a second key shared with the third device, the key seed and second key being stored in the memory;
 subsequently erasing at least a portion of the first and second keys from the memory to prevent execution of the security operation by the first device; and
 during a subsequent period in which the first device is in communication with the third device:
 receiving a key hint from the third device, the key hint being generated by a second cryptographic operation at the third device using the second key and a message known to the first device;
 regenerating the second key using the key hint and the known message; and
 regenerating the first key by performing a third cryptographic operation using the key seed and the regenerated second key;
 wherein the third device is a portable device that is in communication with the first device when located with the first device and is not in communication with the first device when located away from the first device;
 wherein the subsequent period in which the first device is in communication with the third device is a period in which the third device is co-located with the first device following an immediately preceding period in which the third device is not co-located with the first device and not in communication with the first device; and
 the erasing is performed during the immediately preceding period.

14. A device according to claim 13, wherein the first key is password or personal identification number of a user of the first device, and the security operation is a login process of an online service provided via the second device.

15. A device according to claim 13, wherein the second key is an encryption key used in symmetric key encryption of communications between the first device and the third device unrelated to the security operation.

16. A device according to claim 13, wherein the third device is a peripheral input/output device for the first device.

17. A device according to claim 16, wherein the peripheral input/output device is a wireless audio headset.

18. A device according to claim 16, wherein the peripheral input/output device is operative to engage in a pairing operation with the first device by which the second key is established.

19. A device according to claim 18, wherein the second key is an encryption key used in symmetric key encryption of communications between the first device and the peripheral input/output device.

20. A device according to claim 13, wherein regenerating the second key includes brute-force searching of at least a portion of a key space containing the second key.

21. A device according to claim 20, wherein the portion of the key space is a sub-space defined by a retained portion of the second key which is retained during the erasing, and wherein regenerating the second key includes regenerating an erased portion of the second key and combining the regenerated erased portion with the retained portion.

22. A device according to claim 13, wherein the key hint includes predictable data conveyed from the third device to the first device in a normal operation unrelated to the security operation.

23. A device according to claim 22, wherein the predictable data is a response provided in a challenge-response exchange constituting the normal operation between the first device and the third device.

24. A device according to claim 23, wherein at least one of the key hint and the known message is one of multiple key hints and/or known messages respectively, the multiple key hints and/or known messages being used in the regenerating of the second key.

* * * * *